US008502690B2

(12) United States Patent
Takizawa

(10) Patent No.: US 8,502,690 B2
(45) Date of Patent: Aug. 6, 2013

(54) PRINTER, CASH DRAWER DRIVE DEVICE, CONTROL METHOD FOR A CASH DRAWER DRIVE DEVICE, AND A CONTROL PROGRAM

(75) Inventor: Jinichi Takizawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 633 days.

(21) Appl. No.: 12/648,159

(22) Filed: Dec. 28, 2009

(65) Prior Publication Data

US 2010/0171627 A1 Jul. 8, 2010

(30) Foreign Application Priority Data

Jan. 5, 2009 (JP) ................................ 2009-000333
Jul. 3, 2009 (JP) ................................ 2009-158664

(51) Int. Cl.
*G08B 21/00* (2006.01)
*H02K 41/00* (2006.01)
*G07G 1/00* (2006.01)

(52) U.S. Cl.
USPC ........... 340/665; 340/668; 310/12.01; 235/22

(58) Field of Classification Search
USPC .................. 340/540, 541, 542, 545.2, 568.1, 340/570, 657, 665, 691.1, 691.7, 691.8, 668; 312/223.2; 235/22, 375, 383; 310/12.01, 310/20, 21
See application file for complete search history.

(56) References Cited

U.S. PATENT DOCUMENTS 5,723,850 A * 3/1998 Lambert ......................... 235/22
6,734,582 B2 * 5/2004 Corbett et al. ............. 310/12.01
6,879,065 B2 * 4/2005 Corbett et al. ............. 310/12.01
7,075,426 B2 * 7/2006 Johnson et al. ............ 340/539.1
2005/0283403 A1 * 12/2005 Ramirez et al. ................. 705/16

FOREIGN PATENT DOCUMENTS

JP 09-245250 A 9/1997
JP 2000-172950 A 6/2000
JP 2003-036474 A 2/2003
JP 2007-286878 A 11/2007

* cited by examiner

*Primary Examiner* — Van T. Trieu
(74) *Attorney, Agent, or Firm* — Kilpatrick Townsend & Stockton LLP

(57) ABSTRACT

A printer, a printer control method and control program, a POS terminal device, and a cash drawer drive device detect when a non-standard cash drawer is connected, and prevents a non-recoverable overcurrent protection device from operating (such as a fuse blowing) by preventing an overcurrent from flowing to the cash drawer. A printer 10 that can be connected to and drive a cash drawer 20 has a cash drawer drive circuit unit 12 that supplies drive current for driving a lock release coil 21 to open/close the cash drawer 20, a coil resistance detection unit 14 that detects the resistance of the lock release coil 21, and a drive switching unit 15 that connects the cash drawer drive circuit unit 12 or connects the coil resistance detection unit 14 to the lock release coil 21.

20 Claims, 4 Drawing Sheets

PRINTER, CASH DRAWER DRIVE DEVICE, CONTROL METHOD FOR A CASH DRAWER DRIVE DEVICE, AND A CONTROL PROGRAM

CROSS-REFERENCES TO RELATED APPLICATIONS

This application claims priority under 35 U.S.C. §119 to Japanese Patent Application Nos: 2009-000333 filed on Jan. 5, 2009, and 2008-158664 filed on Jul. 3, 2009, the entire disclosure of which are expressly incorporated by reference herein.

BACKGROUND

1. Technical Field

The present invention relates to a printer, a cash drawer drive device, a control method for a cash drawer drive device, and a control program.

2. Related Art

POS systems used in retail stores, for example, generally have a POS terminal, a POS printer, and a cash drawer for holding money and equivalent instruments (referred to as simply "money" below) at the checkout counter. The cash drawer is connected to at least one of a cash drawer drive device, the POS terminal, or the POS printer. The lock that holds the drawer tray storing money secure inside the case is released by a drive current supplied from one of these connected devices so that the drawer tray slides out and opens.

FIG. 5 shows the cash drawer locking mechanism described in Japanese Unexamined Patent Appl. Pub. JP-A-2000-172950.

As shown in FIG. 5, this cash drawer locking mechanism has a linkage unit 116, a drawer lock mechanism 117, a drawer tray 118, a spring 119, a plunger 120 (actuator), a spring 121, and a fastening hook 122. The linkage unit 116 couples the plunger 120 and the drawer lock mechanism 117. When a specific voltage is applied to a solenoid (coil) 115, current flows through the solenoid (coil) 115, and the plunger is driven and moves in the direction disengaging the lock. When the plunger 120 moves in the direction disengaging the lock, the drawer lock mechanism 117 rotates counterclockwise pivoting on a center point, and the lock engaged with the drawer tray 118 is disengaged by the drawer lock mechanism 117. The drawer tray 118 is pushed to the right in FIG. 5 (the opening direction) and pops to the outside at this time as a result of the urging force of the spring 119 so that the user can insert or remove money. The cash drawer is locked as a result of the user simply pushing the drawer tray 118 into the case. At this time a protrusion from the drawer tray 118 contacts the drawer lock mechanism 117, and the drawer lock mechanism 117 rotates counterclockwise as it is pushed up. As the drawer tray 118 is pushed further inside, the drawer lock mechanism 117 rides over the protrusion and then pivots clockwise, catches (engages) the protrusion, and locks.

The coil resistance and other aspects of the cash drawer described above are set according to the specifications of a specific POS printer (or POS terminal). If the specifications of the specific POS printer (or POS terminal) change, the specifications of the cash drawer may also change. In addition, a particular cash drawer is typically assigned to each cashier in a store in order to prevent theft, for example, and when one clerk switches with another, the clerks must appropriately remove or install their own cash drawer, or the cash drawer may be connected to the POS printer (or POS terminal) only when the store is open and removed for security when the store is closed.

System components may also be replaced with different components when the system is upgraded or when a device fails. When a plurality of POS printers (or POS terminals) with different specifications from different manufacturers or device models are used in the same store, there may also be multiple cash drawers with different specifications. Specific examples of different specifications include the drive voltage and the drive current of the POS printer (or POS terminal) drive circuit.

The coil resistance of the cash drawer is determined according to the specifications of these other devices. Mistakenly connecting a cash drawer to a POS printer (POS terminal) having different specifications can therefore cause an equipment failure or other problem. As a result, POS printers (POS terminals) according to the related art typically have an overcurrent protection device such as a fuse disposed in the cash drawer drive circuit, and if a cash drawer with different specifications (outside the rated tolerance) is connected, the fuse blows and protects against overcurrent flowing to the POS printer (POS terminal) or cash drawer.

However, when protection is provided by an overcurrent protection device such as a fuse according to the related art and the overcurrent protection device works (such as when the fuse blows), the overcurrent protection device cannot be reset and the printer, for example, stops working. The user (checkout clerk, for example) does not know why the device stopped working, and must call a technician or repairman to determine why the printer, for example, stopped working or inspect and repair the device. While the printer, for example, is being inspected and repaired (such as while replacing the fuse), that printer cannot be used.

SUMMARY

A printer, a printer control method and control program, a POS terminal device, and a cash drawer drive device according to at least one embodiment of the present invention detect when a non-standard cash drawer is connected to the printer, for example, and prevents a non-recoverable overcurrent protection device from operating (such as a fuse blowing) by preventing overcurrent from flowing.

A first aspect of the invention is a printer that can drive a cash drawer connected thereto, and includes a drive circuit unit that supplies power to an actuator in order to open the cash drawer tray; a resistance detection unit that detects the resistance of the actuator; and a drive switching unit that switches to connect the drive circuit unit or connect the resistance detection unit to the actuator.

This aspect of the invention can apply a low voltage, such as the voltage for a logic circuit, for detecting the actuator resistance (specifically, the resistance of the actuator coil) from a resistance detection unit, and can detect the resistance of the cash drawer actuator before energizing the actuator to open or close the connected cash drawer. Connection of a nonstandard cash drawer with different specifications can therefore be detected, and applying an overcurrent to a nonstandard cash drawer can therefore be prevented. Operation of an overcurrent protection device (such as a fuse blowing) that cannot be reset inside the printer as a result of energizing a nonstandard cash drawer can therefore be prevented.

Preferably, the printer also has an error notification unit that reports an error when the actuator resistance detected by the resistance detection unit is other than a specified value.

When the connected cash drawer is not standard, this aspect of the invention can prohibit driving the actuator from the drive circuit unit, issue a report from the error notification unit, and appropriately report to the user. The user can therefore be made aware that replacing the cash drawer with a cash drawer that meets the specifications is required.

Yet further preferably, the drive switching unit is switched so that the resistance detection unit is connected to the actuator and detects the resistance of the actuator when the cash drawer is connected.

This aspect of the invention can check whether or not the cash drawer meets the specifications when the cash drawer is connected.

Yet further preferably, the drive switching unit is switched so that the resistance detection unit is connected to the actuator and detects the resistance of the actuator when the power turns on, a self-diagnostic test executes, or before driving the cash drawer.

This aspect of the invention can check whether or not the cash drawer meets the specifications at a desirable time, such as when the power turns on, a self-diagnostic test executes, or before driving the cash drawer.

Yet further preferably, the printer can be connected to a host computer, and receives a command that is sent from the host computer and instructs detecting the actuator resistance, switches the drive switching unit to connect the resistance detection unit to the actuator, and detects the actuator resistance.

This aspect of the invention can receive a command from the host computer and in response immediately check if the connected cash drawer meets the specifications, and can send and report the result to the host computer.

Another aspect of the invention is a control method for a cash drawer drive device that can drive a cash drawer and has a drive circuit unit that supplies power to an actuator for opening the cash drawer tray, a resistance detection unit that detects the resistance of the actuator, a drive switching unit that switches to connect the drive circuit unit or connect the resistance detection unit to the actuator, and an error notification unit, the control method including steps of: switching the drive switching unit to the resistance detection unit side; pre-energizing the actuator and detecting the actuator resistance; and comparing the detected actuator resistance with a specified value, and prohibiting actuator drive from the drive circuit unit and reporting an error on the error notification unit when the detected actuator resistance is other than a specified value, and supplying power to drive the actuator when the detector actuator resistance is a value within the specified value.

The control method according to this aspect of the invention can switch the drive switching unit to the resistance detection unit side, pre-energize for detecting the resistance from the resistance detection unit, and detect the resistance of the cash drawer before energizing the actuator of the cash drawer to open the tray. Connection of a nonstandard cash drawer with different specifications can therefore be detected, and applying an overcurrent to a cash drawer that does not meet the specifications can therefore be prevented. Operation of an overcurrent protection device (such as a fuse blowing) inside the printer as a result of energizing a nonstandard cash drawer can also be prevented. In addition, because connection of a nonstandard cash drawer can be indicated on the error notification unit and the user can be appropriately informed that the cash drawer does not meet the specifications, the user can be made aware that replacing the cash drawer with a cash drawer that meets the specifications is required.

Another aspect of the invention is a control program for a cash drawer drive device that causes the control unit of a printer to execute the steps of the cash drawer drive device control method described above.

By causing the control unit of a cash drawer drive device to execute the cash drawer drive device control program, supplying an overcurrent to a nonstandard cash drawer can be prevented. Operation of an overcurrent protection device (such as a fuse blowing) inside the printer as a result of energizing a nonstandard cash drawer can also be prevented. In addition, because connection of a nonstandard cash drawer can be indicated on the error notification unit and the user can be appropriately informed that the cash drawer does not meet the specifications, the user can be made aware that replacing the cash drawer with a cash drawer that meets the specifications is required.

A POS terminal device according to another aspect of the invention is a POS terminal device that can drive a cash drawer connected thereto, and has a drive circuit unit that supplies power for driving an actuator in order to open the cash drawer tray; a resistance detection unit that detects the resistance of the actuator; and a drive switching unit that switches to connect the drive circuit unit or connect the resistance detection unit to the actuator.

This aspect of the invention can apply a low voltage for detecting resistance from a resistance detection unit and can detect the resistance of the cash drawer before energizing the actuator of the connected cash drawer to open the tray. Connection of a nonstandard cash drawer with different specifications can therefore be detected, and applying an overcurrent to a nonstandard cash drawer can therefore be prevented. Operation of an overcurrent protection device (such as a fuse blowing) inside the POS terminal device as a result of energizing a nonstandard cash drawer can therefore be prevented.

Another aspect of the invention is a cash drawer drive device that can drive a cash drawer connected thereto, the cash drawer drive device having a drive circuit unit that supplies power for driving an actuator to open the cash drawer tray; a resistance detection unit that detects the resistance of the actuator; and a drive switching unit that switches to connect the drive circuit unit or connect the resistance detection unit to the actuator.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printer, a printer control method and control program, and a POS terminal device according to the invention is described below with reference to the accompanying figures.

Figure 1:
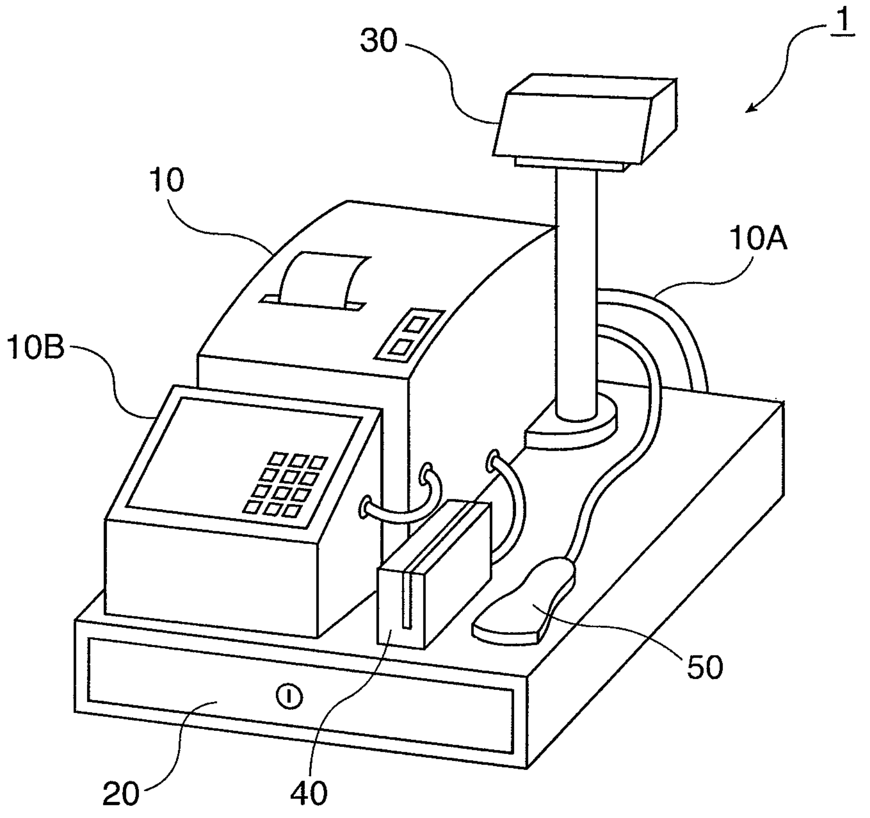
FIG. 1 is an oblique view showing a POS terminal device and printer according to a preferred embodiment of the invention.
Figure 2:
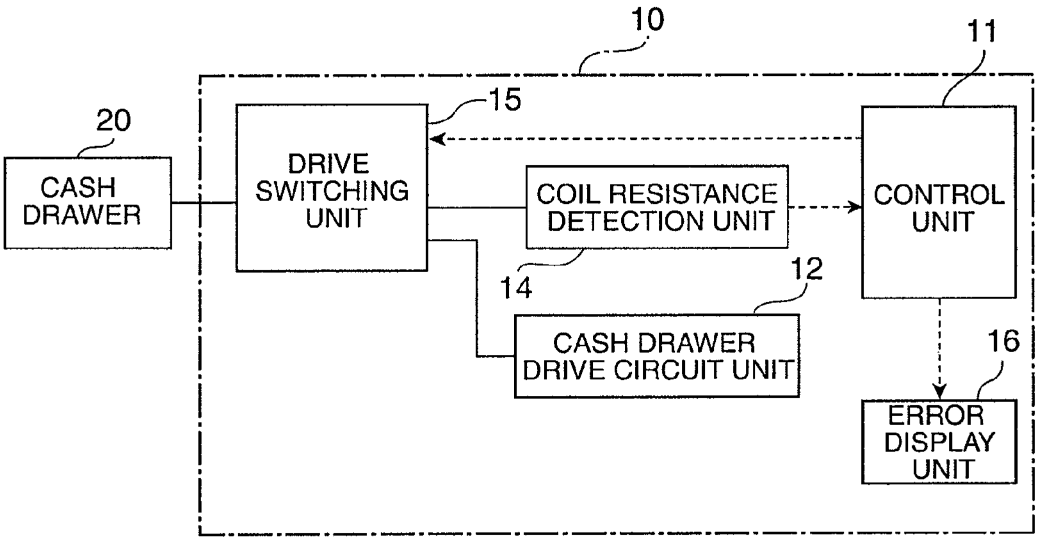
FIG. 2 is a block diagram showing the configuration of the part that is related to driving the cash drawer in the printer according to a preferred embodiment of the invention.

FIG. 1 is an oblique view showing a POS terminal device and printer according to a preferred embodiment of the invention. FIG. 2 is a block diagram showing the configuration of the part that is related to driving the cash drawer in the printer according to a preferred embodiment of the invention.

As shown in FIG. 1, the main components of the POS system 1 are a POS printer 10, and a POS terminal device 10B including an input unit (such as a touch panel or keypad). Also included are a cash drawer 20 that is connected to and driven by the POS printer 10 through a connection cable 10A, a pole display 30, a card reader 40, and a barcode scanner 50.

As shown in FIG. 2, the POS printer 10 has a control unit (CPU) 11, a cash drawer drive circuit unit 12 (drive circuit unit), a coil resistance detection unit 14 (resistance detection unit), a drive switching unit 15, and an error display unit 16 (notification unit). Note that the dotted lines in FIG. 2 indicate paths of signal flow (including data and control signals), and the solid lines show the paths of current flow.

The control unit 11 centrally controls the overall operation of the printer 10.

The cash drawer drive circuit unit 12 supplies drive current (power) to the lock release coil 21 (actuator) of the cash drawer 20.

The coil resistance detection unit 14 detects the coil resistance of the cash drawer 20.

The drive switching unit 15 is a switch that switches between and connects either the cash drawer drive circuit unit 12 or the coil resistance detection unit 14 to the lock release coil 21 of the cash drawer 20.

The error display unit 16 reports when the cash drawer 20 is non-standard.

Figure 3:
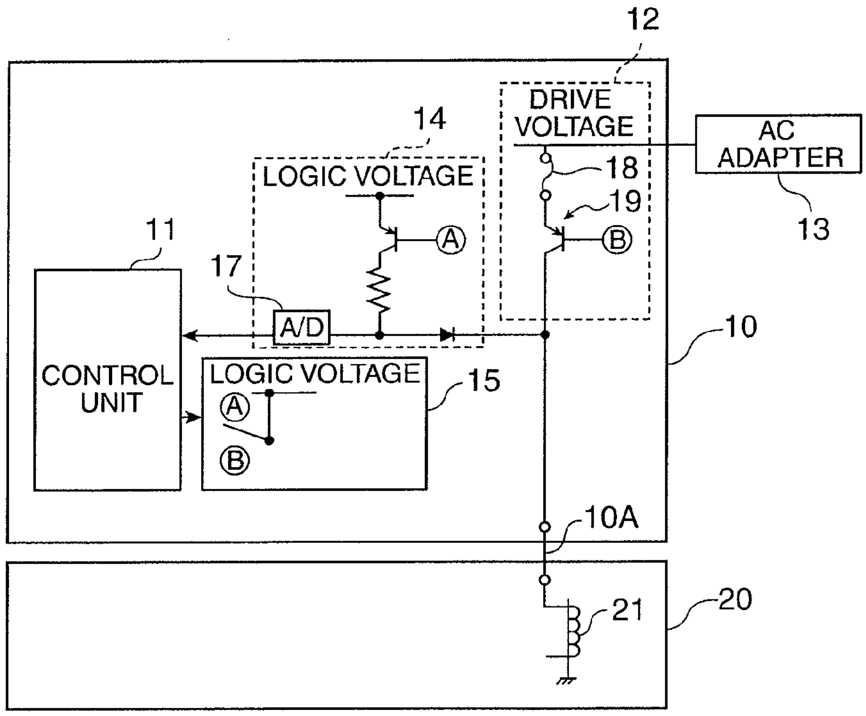
FIG. 3 is a circuit diagram showing the circuit design of the part that is related to driving the cash drawer in the printer according to a preferred embodiment of the invention.

FIG. 3 is a circuit diagram showing the circuit design of the part that is related to driving the cash drawer in the printer according to a preferred embodiment of the invention.

FIG. 3 shows an example of a circuit design enabling the function units shown in FIG. 2, and more particularly shows the circuit design of the cash drawer drive circuit unit 12, the coil resistance detection unit 14, and the drive switching unit 15.

The cash drawer drive circuit unit 12 is a fuse 18 (overcurrent protection device) and switching transistor 19. When the cash drawer drive current supplied from the AC adapter 13 to the lock release coil 21 of the cash drawer 20 exceeds a certain threshold (reaches an overcurrent level), the fuse 18 blows and prevents the current from damaging other parts of the printer 10. It should be noted that a 3-terminal regulator or other device may be used as the overcurrent protection device instead of a fuse.

The coil resistance detection unit 14 pre-energizes the lock release coil 21 of the cash drawer 20 so that the resistance can be detected. The resistance of the lock release coil 21 is detected from the current that flows as a result of pre-energizing, the resistance is digitized by an analog/digital (A/D) conversion unit 17, sent to the control unit 11, and compared with the rated value stored in ROM, for example, in the control unit 11.

The drive switching unit 15 switches to input the drive signal (such as a 5-V or 3.3-V signal for the logic circuit) to the terminal B of the cash drawer drive circuit unit 12 or to the terminal A of the coil resistance detection unit 14. When connected to terminal A, the coil resistance detection unit 14 is connected to the lock release coil 21 of the cash drawer 20, and the coil resistance can be detected. When connected to terminal B, the cash drawer drive circuit unit 12 is connected to the lock release coil 21 of the cash drawer 20, a DC voltage of the 24-V drive voltage, for example, is applied from the AC adapter 13, and drive current can be supplied to the cash drawer 20.

Note that the printer 10 and the cash drawer 20 are connected by a connection cable 10A (such as a shielded cable) for supplying drive current. Current from the AC adapter 13 may pass through a power supply circuit in the printer 10. Note, further, that 24 V is the voltage used to drive the heads and motors in the printer 10, and a common power supply can be used.

The lock release coil 21 is normally designed for a 1-A current. For example, if the drive voltage from the printer 10 is 24 V, the lock release coil 21 has a 24-ohm (Ω) design. If the drive voltage from a printer 10 with different specifications is 12 V, the lock release coil 21 has a 12-ohm (Ω) design. If a cash drawer having a 12-ohm (Ω) lock release coil 21 is connected to a printer 10 with a 24-V drive voltage, a 2-A overcurrent will flow to the coil.

The operation of the printer 10 described above is described next.

Figure 4:
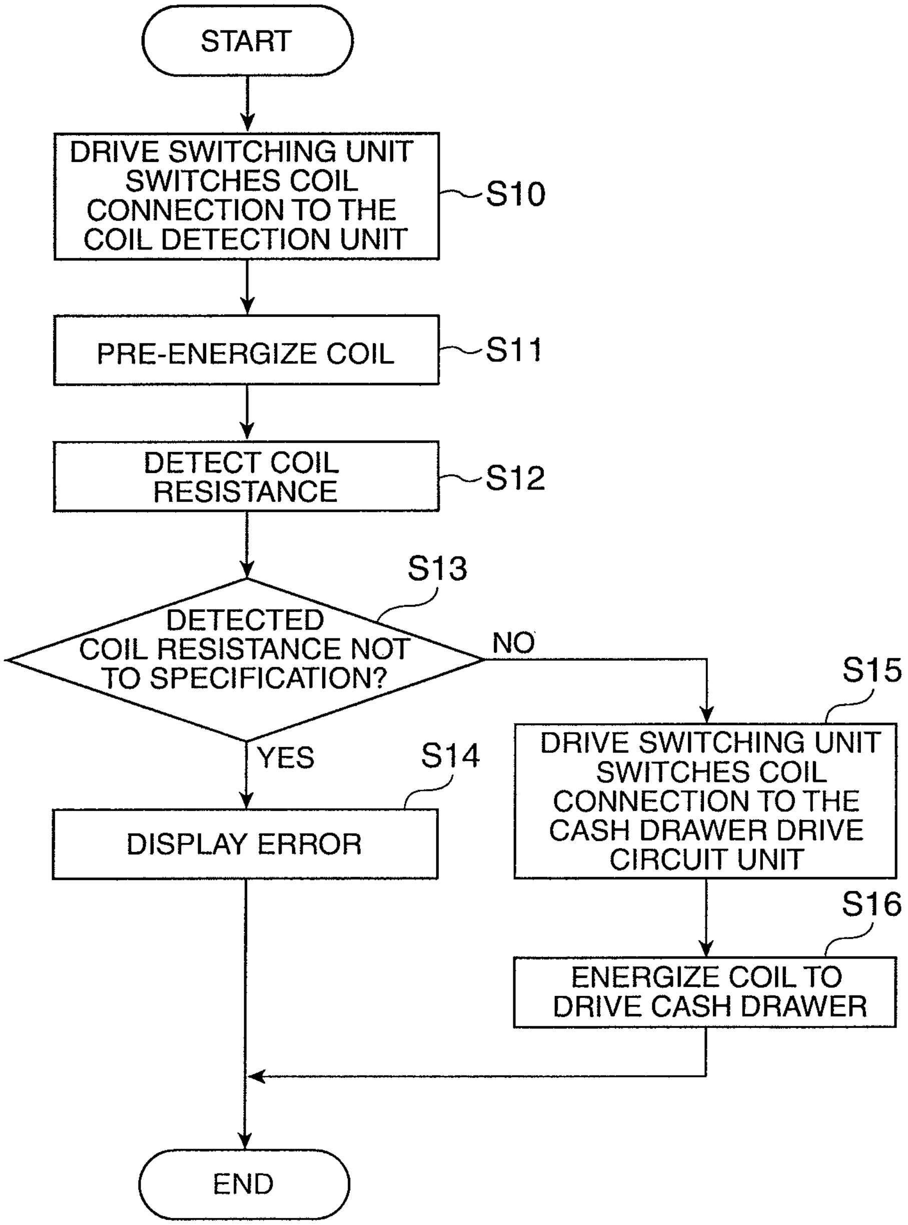
FIG. 4 is a flow chart showing the cash drawer drive process of the printer according to a preferred embodiment of the invention.
Figure 5:
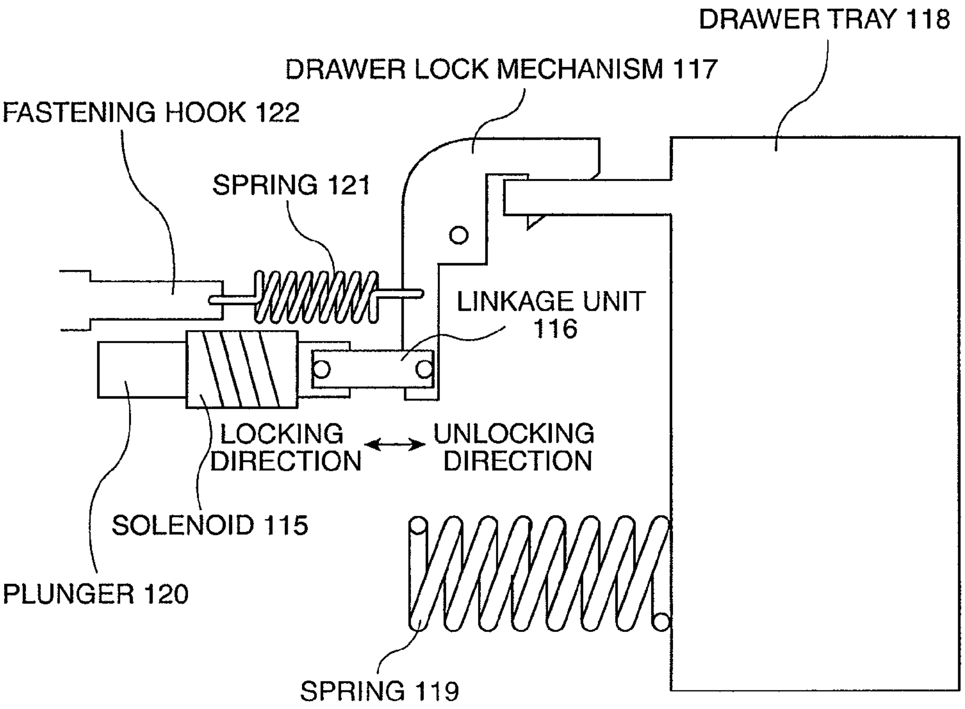
FIG. 5 shows the configuration of the cash drawer lock mechanism described in JP-A-2000-172950.

FIG. 4 is a flow chart showing the cash drawer drive process of the printer 10 according to this preferred embodiment of the invention.

First, the following command (1) sent from the POS terminal device 10B and instructing the printer to detect the resistance of the lock release coil 21 is received and executed.

ESC Drawer Check (1)

When this command is received, the control unit 11 causes the switch in the drive switching unit 15 to operate and changes the connection to the lock release coil 21 to the coil resistance detection unit 14 (step S10).

The lock release coil 21 of the cash drawer 20 is then pre-energized from the coil resistance detection unit 14 (step S11), and the resistance of the lock release coil 21 is detected from the current flow produced by this pre-energizing (step S12). This value is digitized by the A/D conversion unit 17 and output to the control unit 11.

The control unit 11 compares the detected value with the standard value (the coil resistance at which the drive current is within the allowable range, such as 24 ohm (□) stored in ROM, for example, in the control unit 11, and determines if the coil resistance detected in step S12 is nonstandard (step S13).

If the detected resistance is, for example, 12 □ and non-standard, an appropriate message is displayed on the error display unit 16 and the user is prompted to replace the cash drawer with a cash drawer having the standard coil resistance (step S14). In this situation the control unit 11 prohibits the switch of the drive switching unit 15 from connecting to the lock release coil 21. The result may also be sent to the POS terminal device 10B, and an error may be displayed on the POS terminal device 10B or an alarm may be sounded.

If the coil resistance is within the standard, however, the control unit 11 causes the drive switching unit 15 to operate so that the switch switches to the cash drawer drive circuit unit 12 (step S15). As a result, the cash drawer 20 can be energized, and when the drive current is supplied the cash drawer 20 is driven and the lock of the cash drawer 20 is disengaged by the movement of the lock release coil 21 (step S16). Note that drive current is supplied to the cash drawer 20 in response to a cash drawer drive command received from the POS terminal device 10B. This command for driving the cash drawer is a command such as command (2) below that produces a pulse signal of the logic level that is the drive signal.

ESC Drawer n Ton Toff (2)

where Drawer n is a parameter specifying driving cash drawer n when there are plural cash drawers, Ton is a parameter specifying the on time of the pulse signal, and Toff is a parameter specifying the off time of the pulse signal.

Switching the position of the switch in the drive switching unit 15 to the coil resistance detection unit 14 in the first step of the process described above may be done when connection of a cash drawer 20 to the printer 10 is detected, or it may be configured to occur every time the printer 10 power turns on (the printer starts up).

A configuration in which the resistance of the lock release coil 21 is detected at an appropriate time, such as before the printer 10 is driven or during a self-diagnostic test, is also conceivable. In this configuration, the resistance may be detected conditionally, such as at a regular interval while the printer 10 is turned on, or when the internal temperature of the printer 10 exceeds a specific setting.

Note, further, that the host computer may be disposed inside the POS terminal device 10B as shown in FIG. 1, or outside the POS terminal device 10B.

As described above, the printer 10 according to this embodiment of the invention can switch the drive switching unit 15 to the coil resistance detection unit 14 side before energizing the lock release coil 21 of the cash drawer 20 to open or close, the coil can be pre-energized from the coil resistance detection unit 14 to detect the coil resistance, and the coil resistance of the cash drawer 20 can be detected. As a result, connection of a nonstandard cash drawer 20 can be detected, and energizing a nonstandard cash drawer 20 to open or close can be prevented before current is supplied.

A fuse 18 in the printer 10 can therefore be prevented from blowing (operation of an overcurrent protection device can be prevented) as a result of energizing a nonstandard cash drawer 20 that does not match the specifications of the printer.

Furthermore, because a message appropriately informing the user that the cash drawer is nonstandard can be presented on the error display unit 16, the user can be made aware that replacing the nonstandard cash drawer 20 with a standard cash drawer 20 is required.

The cash drawer 20 can also be driven by a cash drawer drive device having the circuit configuration shown in FIG. 3 instead of by the printer 10 or POS terminal device 10B. In this configuration the cash drawer drive device is connected to the POS terminal device 10B and, for example, can receive commands therefrom.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printer that can drive a cash drawer connected thereto, comprising:

a drive circuit unit that supplies power for driving an actuator in order to open the cash drawer;

a resistance detection unit that detects the resistance of the actuator; and a drive switching unit that switches to connect the drive circuit unit or connect the resistance detection unit to the actuator.

2. The printer described in claim 1, further comprising:

an error notification unit that prohibits actuator drive from the drive circuit unit and reports an error when the actuator resistance detected by the resistance detection unit is other than a specified value.

3. The printer described in claim 2, wherein the resistance detection unit determines that the cash drawer connected to the printer is a nonstandard cash drawer with incorrect specifications, when the actuator resistance detected by the resistance detection unit is other than the specified value.

4. The printer described in claim 2, wherein the drive switching unit switches to connect the drive circuit unit to the actuator when the actuator resistance detected by the resistance detection unit is the specified value.

5. The printer described in claim 1, wherein:

the drive switching unit is switched so that the resistance detection unit is connected to the actuator and detects the resistance of the actuator when the cash drawer is connected.

6. The printer described in claim 1, wherein:

the drive switching unit is switched so that the resistance detection unit is connected to the actuator and detects the resistance of the actuator when the power turns on, a self-diagnostic test executes, or before driving the cash drawer.

7. The printer described in claim 1, wherein:

the printer can be connected to a host computer; and receives a command that is sent from the host computer and instructs detecting the actuator resistance, switches the drive switching unit to connect the resistance detection unit to the actuator, and detects the actuator resistance.

8. The printer described in claim 1, wherein the actuator comprises a solenoid that is driven by the drive circuit in order to open the cash drawer, wherein the resistance detection unit detects the resistance of the solenoid.

9. The printer described in claim 1, wherein the drive circuit unit comprises a fuse and a switching transistor.

10. A control method for a cash drawer drive device that can drive a cash drawer and has a drive circuit unit that supplies power to an actuator that opens/closes the cash drawer, a resistance detection unit that detects the resistance of the actuator, a drive switching unit that switches to connect the drive circuit unit or connect the resistance detection unit to the actuator, and an error notification unit, the control method comprising steps of:

switching the drive switching unit to the resistance detection unit side;

pre-energizing the actuator and detecting the actuator resistance;

comparing the detected actuator resistance with a specified value, and prohibiting actuator drive from the drive circuit unit when the detected actuator resistance is other than a specified value.

11. The control method described in claim 10, further comprising:

supplying power to drive the actuator when the detector actuator resistance is a value within the specified value.

12. A control program for a cash drawer drive device that causes the printer control unit to execute the steps of the cash drawer drive device control method described in claim 10.

13. The control method described in claim 10, wherein the actuator comprises a solenoid that is driven by the drive circuit in order to open/close the cash drawer, wherein detecting the actuator resistance comprises detecting the resistance of the solenoid.

14. The control method described in claim 10, further comprising reporting an error on the error notification unit when the detected actuator resistance is other than the specified value.

15. The control method described in claim 10, further comprising determining that the cash drawer connected to the cash drawer device is a nonstandard cash drawer with incorrect specifications, when the detected actuator resistance is other than the specified value.

16. A cash drawer drive device that can drive a cash drawer connected thereto, comprising:

a drive circuit unit that supplies drive current for driving an actuator to open/close the cash drawer;

a resistance detection unit that detects the resistance of the actuator; and a drive switching unit that switches to connect the drive circuit unit or connect the resistance detection unit to the actuator.

17. The cash drawer drive device described in claim 16, further comprising:

an error notification unit that prohibits actuator drive from the drive circuit unit and reports an error when the actuator resistance detected by the resistance detection unit is other than a specified value.

18. The cash drawer drive device described in claim 16, wherein:

the drive switching unit is switched so that the resistance detection unit is connected to the actuator and detects the resistance of the actuator when the cash drawer is connected.

19. The cash drawer drive device described in claim 16, wherein:

the drive switching unit is switched so that the resistance detection unit is connected to the actuator and detects the resistance of the actuator when the power turns on, a self-diagnostic test executes, or before driving the cash drawer.

20. The cash drawer drive device described in claim 16, wherein:

the cash drawer drive device can be connected to a host computer; and receives a command that is sent from the host computer and instructs detecting the actuator resistance, switches the drive switching unit to connect the resistance detection unit to the actuator, and detects the actuator resistance.

* * * * *